US010127522B2

(12) United States Patent
Pennacchiotti et al.

(10) Patent No.: US 10,127,522 B2
(45) Date of Patent: Nov. 13, 2018

(54) AUTOMATIC PROFILING OF SOCIAL MEDIA USERS

(75) Inventors: Marco Pennacchiotti, Mountain View, CA (US); Ana-Maria Popescu, Mountain View, CA (US)

(73) Assignee: Excalibur IP, LLC, New York, NY (US)

( * ) Notice: Subject to any disclaimer, the term of this patent is extended or adjusted under 35 U.S.C. 154(b) by 398 days.

(21) Appl. No.: 13/183,260

(22) Filed: Jul. 14, 2011

(65) Prior Publication Data

US 2013/0018968 A1 Jan. 17, 2013

(51) Int. Cl.
*G06Q 10/10* (2012.01)
*G06Q 30/02* (2012.01)
*G06Q 50/00* (2012.01)

(52) U.S. Cl.
CPC ......... *G06Q 10/10* (2013.01); *G06Q 30/0201* (2013.01); *G06Q 50/01* (2013.01)

(58) Field of Classification Search
CPC ..... G06Q 10/10; G06Q 30/0201; G06Q 50/01
See application file for complete search history.

(56) References Cited

U.S. PATENT DOCUMENTS

| 8,046,797 | B2 * | 10/2011 | Bentolila et al. ............... 725/46 |
| 8,412,645 | B2 * | 4/2013 | Ramaswamy ........ G06F 21/316 706/12 |
| 2003/0191812 | A1 * | 10/2003 | Agarwalla et al. ........... 709/217 |
| 2006/0041828 | A1 * | 2/2006 | King ................ G06F 17/3002 715/205 |
| 2007/0282867 | A1 * | 12/2007 | McAllister ............ G06Q 30/02 707/999.1 |
| 2008/0148338 | A1 * | 6/2008 | Weir et al. ......................... 726/1 |
| 2008/0215571 | A1 * | 9/2008 | Huang ............. G06F 17/30719 707/999.005 |
| 2009/0089825 | A1 * | 4/2009 | Coldwell ........................ 725/25 |
| 2009/0183112 | A1 * | 7/2009 | Higgins et al. ............... 715/808 |
| 2009/0248399 | A1 * | 10/2009 | Au .......................... G06F 17/27 704/9 |

(Continued)

FOREIGN PATENT DOCUMENTS

EP 2157520 A1 * 2/2010 ............. G06Q 30/02

OTHER PUBLICATIONS

Christopher Horn, Analysis and Classification of Twitter Messages, Technische Universität Graz (Apr. 29, 2009).*

(Continued)

*Primary Examiner* — Minh Chau Nguyen
(74) *Attorney, Agent, or Firm* — Weaver Austin Villeneuve & Sampson LLP

(57) ABSTRACT

Disclosed are methods and apparatus for classifying users. In accordance with one embodiment, a plurality of messages posted by a user via a microblogging service may be obtained. A set of feature values associated with the user may be obtained, each of the set of feature values corresponding to a different one of a set of one or more features. One or more of the set of feature values may be obtained based, at least in part, on content of the plurality of messages posted by the user, messaging behavior of the user via the microblogging service, and/or social connections of the user established via the microblogging service. The user may be classified based upon the set of feature values associated with the user.

27 Claims, 5 Drawing Sheets

(56) References Cited

U.S. PATENT DOCUMENTS

| | | | | |
|---|---|---|---|---|
| 2009/0319342 | A1* | 12/2009 | Shilman | G06F 17/30864 |
| | | | | 705/7.41 |
| 2010/0312769 | A1* | 12/2010 | Bailey et al. | 709/206 |
| 2011/0022465 | A1* | 1/2011 | Malleshaiah | G06Q 30/02 |
| | | | | 705/14.54 |
| 2011/0078167 | A1* | 3/2011 | Sundaresan | G06F 17/2785 |
| | | | | 707/765 |
| 2011/0145285 | A1* | 6/2011 | Gustafson | G06Q 30/02 |
| | | | | 707/776 |
| 2011/0153414 | A1* | 6/2011 | Elvekrog et al. | 705/14.43 |
| 2011/0225174 | A1* | 9/2011 | Artzt | G06Q 30/02 |
| | | | | 707/750 |
| 2011/0264531 | A1* | 10/2011 | Bhatia | G06Q 30/0269 |
| | | | | 705/14.66 |
| 2012/0030711 | A1* | 2/2012 | Rae et al. | 725/46 |
| 2012/0304072 | A1* | 11/2012 | Mercuri | G06Q 10/00 |
| | | | | 715/745 |

OTHER PUBLICATIONS

Jennifer Golbeck, Justin M. Grimes, and Anthony Rogers, Twitter Use by the U.S. Congress, Journal of the American Society for Information Science and Technology 1612-1621 (vol. 61 Issue 8 May 3, 2010).*

Zi Chu, et al., Who is Tweeting on Twitter: Human, Bot, or Cyborg?, Proceedings of the 26th Annual Computer Security Applications Conference (Dec. 6, 2010).*

Vasileios Lampos and Nello Cristianini, Tracking the flu pandemic by monitoring the Social Web, C.I.P. 2010: 2nd International Workshop on Cognitive Information Processing (Jun. 16, 2010).*

Ravi Parikh and Matin Movassate, Sentiment Analysis of User-Generated Twitter Updates using Various Classification Techniques, ACL HLT 2011 the 49th Annual Meeting of the Association for Computational Linguistics (Jun. 4, 2009).*

Blei, D.; Ng, A.; and Jordan, M. 2002. Latent dirichlet allocation. JMLR (3):993-1022.

Burger, J., and Henderson, J. 2010. An exploration of observable features related to blogger age. In Computational Approaches to Analyzing Weblogs: Papers from the 2006 AAAI Spring Symposium, 710-718.

Cheng, Z.; Caverlee, J.; and Lee, K. 2010. You are where you tweet: A Content-based Approach to Geo-locating Twitter Users. In Proceedings of CIKM.

Fink, C.; Mayfield, J.; Piatko, C.; Finin, T.; and Martineau, J. 2009. Geolocating Blogs from Their Textual Content. In Proceedings of ACL, 710-718.

Friedman, J. H. 2001. Greedy function approximation: A gradient boosting machine. Annals of Statistics 29(5):1189-1232.

Friedman, J. H. 2006. Recent advances in predictive (machine) learning. Journal of Classification 23(2):175-197.

Garera, N., and Yarovsky, D. 2007. Modeling latent biographic attributes in conversational genres. In Proceedings of CIKM.

Herring, S., and Paolillo, J. 2006. Gender and genre variation in weblogs. In Journal of Sociolinguistics.

Java, A.; Song, X.; Finin, T.; and Tseng, B. 2007. Why we twitter: understanding microblogging usage and communities. In Proceedings of the 9th WebKDD and 1st SNA-KDD 2007.

Jones, R.; Kumar, R.; Pang, B.; and Tomkins, A. 2007. I Know What you Did Last Summer—Query Logs and User Privacy. In Proceedings of CIKM.

Otterbacher, J. 2010. Inferring Gender of Movie Reviewers: Exploiting Writing Style, Content and Metadata. In Proceedings of CIKM.

Pasca, M. 2007. What you seek is what you get: Extraction of class attributes from query logs. In Proceedings of IJCAI.

Quantcast. 2010. Report May 2010. In http://www.quantcast.com/twitter.com.

Ramage, D. 2010. Characterizing Microblogs with Topic Models. In Proceedings of ICWSM 2010.

Rao, D.; D., Y.; Shreevats, A.; and Gupta, M. 2010. Classifying Latent User Attributes in Twitter. In Proceedings of SMUC-10, 710-718.

Singh, S. 2001. A pilot study on gender differences in conversational speech on lexical richness measures. In Literary and Linguistic Computing.

Smola, A., and Narayanamurthy, S. 2010. An architecture for parallel topic models. In Proceedings of VLDB.

Thomas, M.; Pang, B.; and Lee, L. 2006. Get out the vote: determining support or opposition from congressional floor debate transcripts. In Proceedings of EMNLP.

Twitter. 2010. Twitter API documentation. In http://dev.twitter.com/docs.

Weber, I., and Castillo, C. 2010. The Demographics of Web Search. In Proceedings of SIGIR.

Wiebe, J.; Wilson, T.; and Cardie, C. 2005. Annotating expressions of opinions and emotions in language. In Language Resources and Evaluation, 165-210.

* cited by examiner

AUTOMATIC PROFILING OF SOCIAL MEDIA USERS

BACKGROUND OF THE INVENTION

The disclosed embodiments relate generally to methods and apparatus for classifying users of a social media service such as a microblogging service according to one or more classes.

Microblogging is a modern communication paradigm in which users post bits of information that are visible by their communities. For example, the information that is posted may include brief text updates, a digital file or hyperlink, or micromedia such as images (e.g., photos), video or audio clips. An item capable of being posted may be referred to as a message.

Examples of microblogging services include social networking sites such as Facebook or Twitter, as well as instant messaging. Through the use of a microblogging service, a user may post a message via the Internet. Similarly, when a user finds a message of another user interesting, the user may repost the message.

SUMMARY OF THE INVENTION

Disclosed are methods and apparatus for automatically profiling social media users. More particularly, users of a social media service such as microblogging may be classified according to one or more classes. This may be accomplished by collecting information pertaining to observable behavior of the user such as messages posted by the user via the microblogging service, messaging behavior of the user via the microblogging service, social connections of the user established via the microblogging service, and/or profile(s) of the user.

In accordance with one embodiment, a plurality of messages posted by a user via a microblogging service may be obtained. A set of feature values associated with the user may be obtained, each of the set of feature values corresponding to a different one of a set of one or more features. One or more of the set of feature values may be obtained based, at least in part, on content of the plurality of messages posted by the user, messaging behavior of the user via the microblogging service, and/or social connections of the user established via the microblogging service. The user may be classified based upon the set of feature values associated with the user.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable users of a social network offering a social media service such as a microblogging service to be classified according to one or more classes. Example classification tasks include the classification of users according to ethnicity, political affiliation, and gender. For example, in order to classify users according to their ethnicity, users may be classified in one or more of the following classes: African-American, Caucasian, Hispanic, and Asian. As another example, users may be classified according to their political orientation in either of two classes: Democrat or Republican. Another example of a classification task includes classification of users according to their gender (e.g., where the classes include male and female).

The above examples of classification tasks are described with reference to two or more classes. However, it is important to note that a classification task may also be based upon a single class, where the classification task includes determining whether users are members of the class. For example, users may be classified according to whether the users are female, or not female.

Classification may be accomplished based upon various features of the users. More particularly, feature values of the features may be determined with respect to the class(es) pertinent to the classification task. Features may include messaging behavioral feature(s), profile feature(s), linguistic message content feature(s), and/or social network feature(s). Example features will be described in further detail below.

Figure 1:
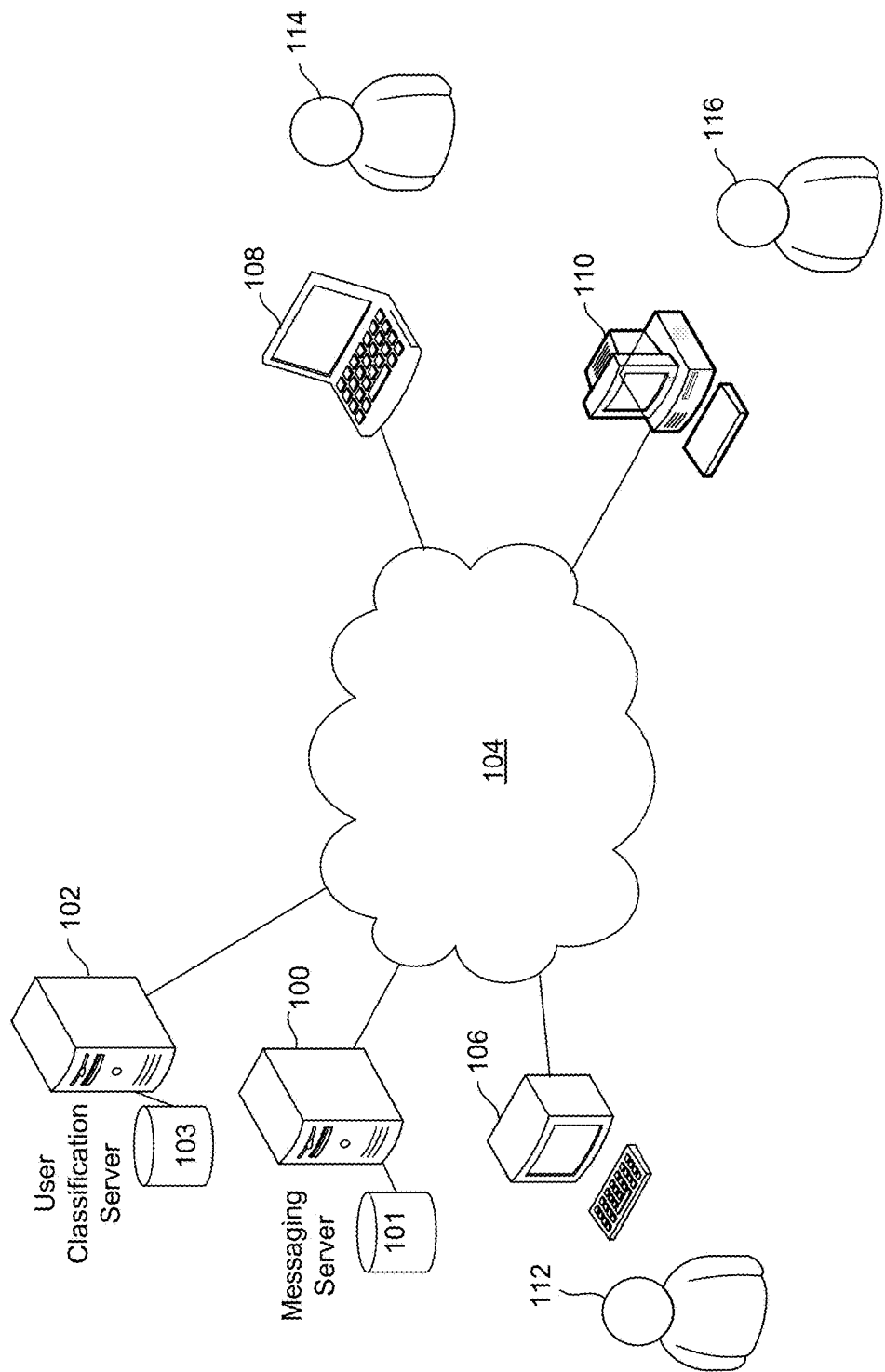
FIG. 1 is a diagram illustrating an example system in which embodiments of the invention may be implemented.

FIG. 1 is a diagram illustrating an example system in which embodiments of the invention may be implemented. As shown in FIG. 1, the system may include one or more Messaging Servers 100 associated with one or more web sites. Each of these web sites may be a social networking web site. Examples of social networking web sites include Yahoo, Facebook, Twitter, Tumblr, LinkedIn, and Meme. Messaging applications may be implemented on any number of servers. However, only one Messaging server 100 is illustrated for clarity and simplification of the description.

The Messaging Server(s) 100 may enable the corresponding web site to provide a variety of services to its users. Each Messaging Server 100 may have access to one or more databases 101 into which message and subscriber information is retained.

In general, some users may subscribe to a particular social networking web site through the Messaging Server(s) 100 to a particular messaging account that is managed by another user, such as a business entity. Subscribing users may post (i.e., transmit) a message on the Internet via a social media service, which may be available via the social networking web site. In accordance with various embodiments, the social media service may be a microblogging service. Posting a message may result in the ability of users of the Internet or a segment of the users of the Internet to access the message. Another user accessing the message may thereafter choose to repost the message. Therefore, the subscribing users may receive or send (i.e.) messages via the Messaging Server(s) 100. For example, a business entity may send tweets regarding business announcements, events, promotional sales, etc.

A segment of users of the Internet having access to messages posted by a user may be referred to as "followers" of the user. A follower of a user may follow postings of the user via the social networking web site of which both the follower and the user are members. The user and/or follower may opt-in or opt-out of a one-way or two-way relationship with one another, enabling the follower to view or otherwise access messages posted by the user.

In accordance with various embodiments, the social networking web site associated with the Messaging Server(s) 100 offers a microblogging service such as Twitter. Many social networking platforms such as Twitter, Facebook, Tumblr, LinkedIn, Meme, etc., offer microblogging features, although there are differences among them. More particularly, different microblogging services may offer different types of messages that can be posted, as well as provide different mechanisms for providing feedback to one other (comments, votes, favorites, etc.). In addition, microblogging services may differ in the way social connections are established (one-way or two-way, with users opting-in or opting-out to being followed by another user). Despite the various differences between the different social networking web sites, the basic mechanics for sharing messages are the same. More particularly, a user posts a message. If other users like the message they may repost the message.

User Classification Server(s) 102 that are associated with one or more social networking web site(s) or associated with another web site such as Yahoo may classify user(s) of the web site based, at least in part, upon one or more features, which may include content of messages posted by the user(s) via the social networking web site(s), messaging behavior of the user via the social networking web site(s), profile(s) of the user established via the social networking web site(s) (or another web site such as Yahoo), and/or aspects of the social network of the user (e.g., established via the social networking web site(s) or another web site such as Yahoo). More particularly, messages may be sent (and received) via the Internet 104 from one or more computers 106, 108, 110 in association with corresponding clients 112, 114, 116, respectively, via the Messaging Server(s) 100. The User Classification Server(s) 102 may obtain information associated with any of the users 112, 114, 116 from the Messaging Server(s) 100 via the Internet 104. More particularly, the User Classification Server(s) may obtain or otherwise receive information pertaining to messages posted by the users 112, 114, 116 via the Messaging Server(s) 100, information pertaining to messaging behavior of the users 112, 114, 116 via the Messaging Server(s) 110, and/or social networking information of the users 112, 114, 116 within the social networking web site (or another web site such as Yahoo). Social networking information may indicate, for example, those followers of a particular user, as well social connections of the particular user. For example, social connections may include "Friends" of the user.

In addition, the User Classification Server(s) 102 may obtain or otherwise receive additional data from the Messaging Server(s) 100 that may be used for purposes of classifying users. This additional data may include user profile(s) or other account information established via the social networking web site(s) and/or another web site associated with the User Classification Server(s) 102, such as Yahoo. The User Classification Server(s) 102 may also enable the clients 112, 114, 116 to submit requests (e.g., search requests) received through a search engine via the Internet 104, generate/modify a profile that defines or represents features of that user, and/or update account data for the user. The account data may include information pertaining to the user's previous purchases, as well as other personal information such as residence address, gender, age, etc. Therefore, the account data may be automatically updated to include information pertaining to the user's purchases. A user's profile may be available to the general public, to those that are members of the web site, and/or to a specific category of those members of the web site. A search request may be a search for a document, web site, web page, an individual, etc.

The User Classification Server(s) 102 may have access to one or more databases 103. Messages received from the microblogging service (e.g., Twitter), as well as other information pertaining to subscriber information (e.g., Yahoo account information), may be retained in the databases 103. The databases 103 may also retain data or computer-readable instructions pertaining to obtaining features used for classification purposes.

The disclosed embodiments enable users of a web site (e.g., social networking web site) to be classified, as will be described in further detail below. More particularly, the server(s) 102 may automatically classify any of users 112, 114, 116 based, at least in part, on content of messages posted by the corresponding user, messaging behavior of the user, social networking information associated with the user, and/or profile(s) of the user. Example methods of classifying a particular user will be described in further detail below. The server(s) 102 may store these classification(s) for a particular user in a database, or generate and provide them on an as-needed basis. The classification(s) may be applied for a variety of purposes including, but not limited to, generation of targeted advertisements, offers, or other services.

Figure 2:
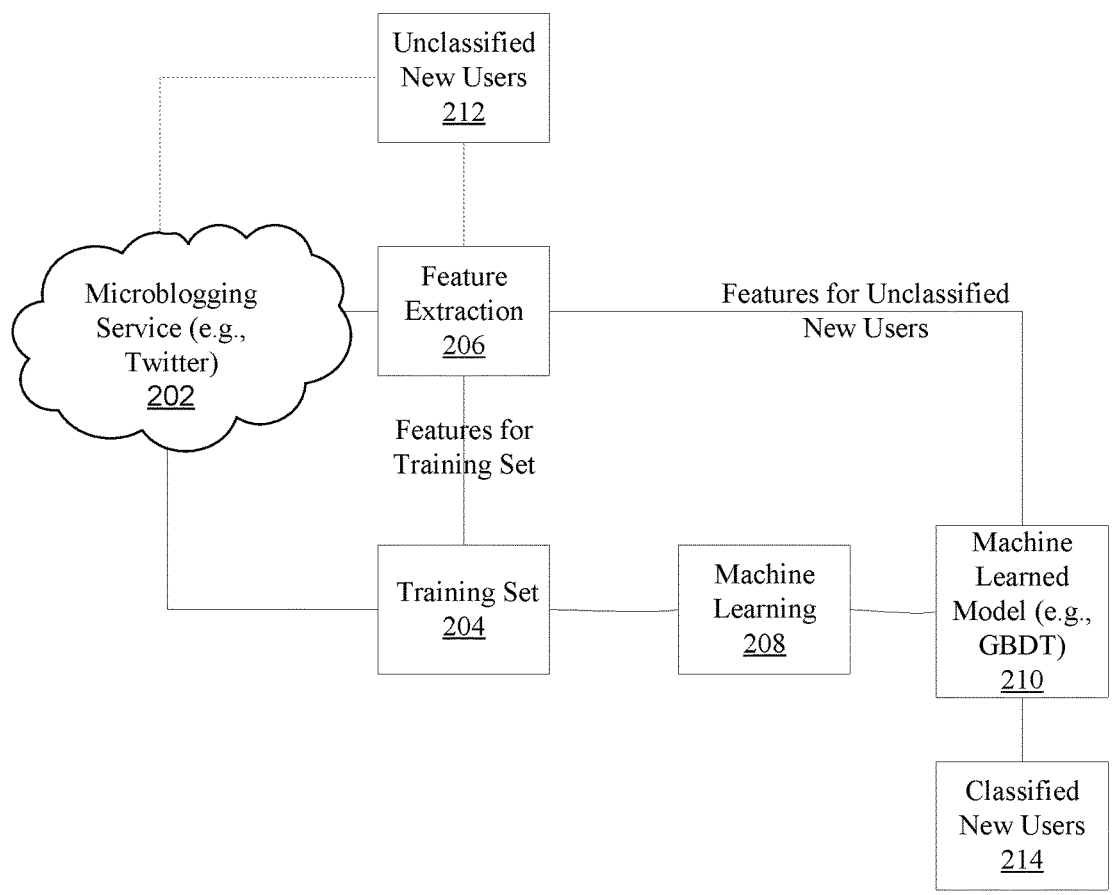
FIG. 2 is a functional block diagram illustrating an example classification system that may be implemented to classify users in a system such as that illustrated in FIG. 1.

FIG. 2 is a functional block diagram illustrating an example classification system that may be implemented to classify users in a system such as that illustrated in FIG. 1. Information obtained from a microblogging service 202 such as Twitter may be used to generate a training set 204. The training set 204 may include a set of feature values associated with each of a plurality of users of the microblogging service 202. More particularly, the training set may be a subset of an entire set of examples pertaining to a larger number of users. In addition, each of the plurality of users of the training set 204 may be labeled to indicate whether the user is a member of each of one or more classes. The training set 204 may be generated manually. Alternatively, the set of feature values for each of the plurality of users of the training set 204 may be ascertained via Feature Extraction 206, as will be described in further detail below.

Based upon the training set 204, machine learning 208 may generate a Machine Learned Model 210 such as Gradient Boosted Decision Trees (GBDT). More particularly, the Machine Learned Model 210 may include a set of one or more equations that may be used to mathematically determine whether a particular user is a member of a particular class based upon the set of feature values associated with the user. Furthermore, the Machine Learned Model 210 may include one or more sets of equations, where each of the sets of equations may be used to determine whether a particular user is a member of a different one of a set of two or more classes. For example, for each class, the Machine Learned Model 210 may establish a weighting of each of the set of feature values that is appropriate for determining whether the user is a member of that class.

In order to classify additional or new users of the microblogging service 202, a set of one or more unclassified users 212 may be obtained or identified. A set of features values associated with each of the set of one or more unclassified users may be obtained using the Feature Extraction 206. The Machine Learned Model 210 may then be used to mathematically determine whether each of the set of one or more unclassified users 212 is a member of a particular class (or classes) using the set of feature values associated with the corresponding one of the set of unclassified users. In this manner, the set of unclassified users 212 may be classified to generate a set of one or more classified users 214.

Figure 3:
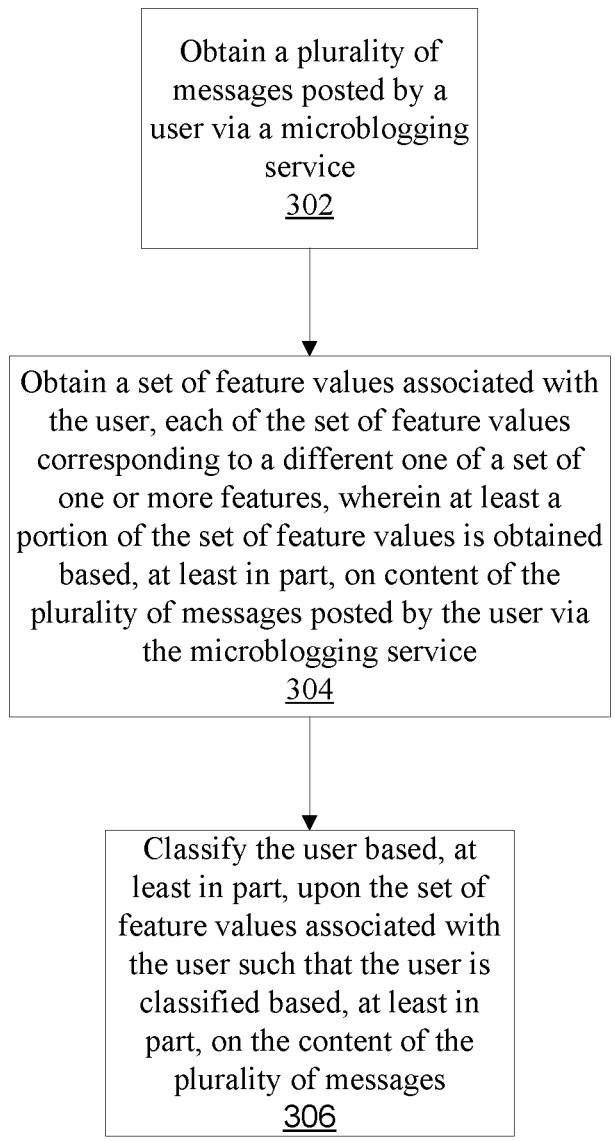
FIG. 3 is a process flow diagram illustrating an example method of classifying users in accordance with various embodiments.

FIG. 3 is a process flow diagram illustrating an example method of classifying users in accordance with various embodiments. The system may obtain a plurality of messages transmitted or posted by a user via a microblogging service at 302. In a microblogging service, messages that are posted are generally shorter than those that are posted via other mechanisms such as blogs. Therefore, the length of each of the plurality of messages posted by the user via the microblogging service may be less than a predefined length.

Since each of the plurality of messages will likely include a limited number of words, the system may aggregate the plurality of messages into one or more documents. In accordance with one embodiment, the plurality of messages may be aggregated into a single document. For example, the plurality of messages may be collected over a particular pre-defined period of time.

For messages that are not text messages, those messages may be converted into text messages for purposes of analysis. For example, audio messages may be converted into text messages using a standard conversion program. Therefore, the disclosed embodiments may be applicable to a variety of types of messages.

The system may obtain a set of one or more feature values associated with the user at 304, each of the set of feature values corresponding to a different one of a set of one or more features. In accordance with one embodiment, at least a portion of the set of feature values is obtained based, at least in part, on content of the plurality of messages posted by the user via the microblogging service. This may be accomplished by analyzing the content of the document in which the messages have been aggregated. More particularly, a set of one or more numerical values characterizing linguistic content of the plurality of messages of the user may be generated. For example, the set of numerical values may pertain to one or more topics of interest to the user (e.g., as identified within the plurality of messages) and/or lexical usage of the user within the plurality of messages. Example features will be described in further detail below.

The system may classify the user at 306 based upon the set of feature values associated with the user such that the user is classified based, at least in part, on the content of the plurality of messages. For example, the system may ascertain whether the user is a member of a particular class, and label the user to indicate whether the user is a member of the particular class.

In accordance with various embodiments, the set of feature values may be used in conjunction with a machine learning framework providing mathematical models for specific user classification tasks. For example, a learning algorithm such as GBDT may be implemented to generate mathematical models for classifying users. One GBDT framework is described by Friedman, J. H Greedy Function Approximation: A Gradient Boosting Machine, The Annals of Statistics 29, 5 (2001), 1189-1232, which document is incorporated herein by reference for all purposes.

The set of features used to classify a user may include any number of features. In the following description, different types of information that may be used to classify a user are described with reference to different feature classes. More particularly, example features are described with reference to four example feature classes. These feature classes include the user profile, user microblogging (e.g., tweeting) behavior, linguistic content of user messages and user social network. Example features are described below with reference to Twitter. However, it is important to note that the disclosed embodiments are equally applicable to other microblogging services. Furthermore, the disclosed embodiments may be implemented using additional or alternate features.

Features

1. User Profile

Many microblogging services publicly display by default a user profile including profile information such as a name of a user, geographical location of the user, and other biographical information. Various microblogging services such as Twitter also provide access to other basic user information, such as number of friends of the user, number of followers of the user, and number of Tweets by the user. Unfortunately, the profile information of many users is often incomplete or inaccurate. As a result, the user profile does not contain enough information to be used independently for user classification purposes.

2. User Microblogging Behavior

The way the user interacts with the micro-blogging service (e.g., microblogging behavior) may be characterized by a set of one or more statistics capturing the way the user interacts with the micro-blogging service. Example statistics include an average number of messages sent per day, an average number of replies sent per day, etc. Unfortunately, microblogging behavior is insufficient for many classification tasks.

3. Linguistic Content

The linguistic content of message(s) sent by the user via the microblogging service may be characterized by a set of one or more statistics (or numerical values) indicating linguistic content information pertaining to the message(s). More particularly, the linguistic content information may include topics of interest to the user and/or lexical usage of the user (e.g., words). Example linguistic content features including prototypical words, prototypical hashtags, sentiment words, and various models, which will be described in further detail below.

Prototypical Words (LING-WORD).

In accordance with various embodiments, a set of one or more classes can each be described or defined by a corresponding set of one or more prototypical words. Prototypical words may include lexical expressions typically used by people in a specific class and/or phrases denoting typical interests of people in that class. For example, younger people tend to use words such as 'dude' or 'lmao'; Democrats tend to use the expression 'health care' more than Republicans. While it is possible to manually generate a list of words representative of a particular class, a probabilistic model may also be employed to automatically extract prototypical words representing a particular class using a set of seed users that are members of that class.

In accordance with one embodiment, given n classes, each class $c_i$ may be represented by a set of seed users $S_i$. For each of the classes, each word w issued by at least one of the seed users is assigned a score. More particularly, the score may represent an estimate of the conditional probability that the seed user is a member of the class given the word. The score may be calculated as follows:

$$proto(w, c_i) = \frac{|w, S_i|}{\sum_{j=1}^{n} |w, S_j|} \quad (1)$$

where $|w,S_i|$ is the number of times the word w is issued by all users for class $c_i$. For each class, we may retain as prototypical words the highest scoring k (e.g., 100) words. The n*k prototypical words collected across all classes may serve as features for representing a given user. More particularly, for each prototypical word wp, the user u may be assigned a score, which may be calculated as follows:

$$f\_proto\_wp(u) = \frac{|u, wp|}{\sum_{w \in W_u} |u, w|} \quad (2)$$

where $|u,wp|$ is the number of times the prototypical word w is issued by user u, and Wu is the set of all words issued by u. For each class, the user may be assigned an aggregated feature value:

$$f\_proto\_c(u) = \frac{\sum_{wp \in W_p} |u, wp|}{\sum_{w \in W_u} |u, w|} \quad (3)$$

where WP is the set of prototypical words for class c. Accordingly, the aggregated feature value for the user may be derived based, at least in part, upon the set of prototypical words for the class and the set of all words issued by the user u, Wu (e.g., which may include a subset of the prototypical words for the class). More particularly, the aggregated feature value for the user may be derived based, at least in part, on the number of times each of the prototypical words (or subset thereof) is issued by the user and the number of times the user issued each of the words in Wu.

Furthermore, in accordance with various embodiments, for each class, the user may be defined by a subset of the set of prototypical words representing that class. In other words, the subset of prototypical words that is identified within a plurality of messages transmitted by the user may represent the user.

Prototypical Hashtags (LING-HASH)

Microblogging users may denote the topic(s) of their message within the message. More particularly, a topic may be identified within a message through the use of a particular character denoting the presence of a topic within the message. For example, Twitter users may use one or more hashtags to denote the topic(s) of their messages (e.g., tweets). The term hashtag may be used to refer to a sequence of characters prefixed by '#' within a tweet to denote a topic of their tweet. Often, the same or similar hashtags may be used by Twitter users in order to facilitate the retrieval and surfacing of information on a particular topic. Therefore, if users from a particular class are interested in the same topics, the most popular such topics may be found by collecting statistics on hashtags used by the users from that class.

A process similar to that described above with respect to prototypical words (LING-WORD) may be applied to extract prototypical hashtags representing a particular class using a set of seed users that are members of that class. More particularly, for each seed user in the set of seed users $S_i$ for a class $c_i$, hashtags contained in the messages (e.g., tweets) of the seed user may be collected. The set of prototypical hashtags may then be derived by applying Equation 1 (where word w is replaced by hashtag h). For each class $c_i$, we may retain as prototypical hashtags the highest scoring k (e.g., 100) hashtags. Feature values for a particular user may then be computed using Equations 2 and 3.

As described above, the set of features used to classify a user may include a set of topics or prototypical hashtags representing a particular class. More particularly, it is possible to identify one or more topics of the plurality of messages transmitted or posted by the user. In accordance with one embodiment, the one or more topics may be identified within the plurality of messages by corresponding hashtags. Accordingly, the aggregated feature value for the user may be derived based, at least in part, upon the set of prototypical hashtags for the class and the set of all words issued by the user u, Wu (e.g., which may include a subset of the prototypical hashtags for the class). More particularly, the aggregated feature value for the user may be derived based, at least in part, on the number of times each of the prototypical hashtags (or subset thereof) is issued by the user and the number of times the user issued each of the words in Wu.

Furthermore, for each class, the user may be defined by a subset of the set of prototypical topics (e.g., hashtags) representing that class. In other words, this subset of prototypical hashtags that is identified within a plurality of messages transmitted by the user, or corresponding feature value, may represent the user.

Sentiment Words (LING-SENT)

In some cases, it is possible to identify terms (e.g., describing entities) about which a particular user class has an overall majority opinion which is not shared by a different class. For example, "Ronald Reagan" is generally viewed positively by Republicans and negatively by Democrats. These terms may be referred to as sentiment words, where a set of one or more sentiment words may be identified for each of the classes. In other words, the set of sentiment words for a particular class may represent the class. Based upon the set of sentiment words for a particular class, it is possible to apply sentiment analysis techniques to messages transmitted by a user to find a sentiment of the user with respect to each sentiment word in the set of sentiment words. For example, the word "like" may be interpreted as a positive sentiment, while the word "hate" may be interpreted as a negative sentiment. Other words such as "vote" may be interpreted as a neutral sentiment. In this manner, it is possible to identify the sentiment of the user expressed in a particular message.

Given a particular user u, the set of messages transmitted by the user, and each term (i.e., sentiment word) t within those messages, it is possible to identify the sentiment of the user that is expressed with respect to one or more sentiment words t. For example, a first set of terms representing a positive sentiment and a second set of terms representing a negative sentiment may be collected. In addition, a third set of terms representing a neutral sentiment may be collected. Alternatively, the absence of a positive or negative sentiment may be interpreted as a neutral sentiment. These different sets of terms may then be applied to identify the number of messages in which a positive sentiment is expressed with respect to t, the number of messages in which a negative sentiment is expressed with respect to t, and/or the number of messages in which a neutral sentiment is expressed with respect to t. For each message and each term (sentiment word) t, it is possible to compute a dominant sentiment in the message with respect to the term t.

In accordance with various embodiments, a dominant sentiment of a particular message may be ascertained by inspecting the phrases in a window of k (e.g., k=4) words to the left and right of a sentiment word t. If a majority of the words within this window are neutral (e.g., not identified as either positive or negative), the message may be classified as neutral with respect to the sentiment word t. Similarly, the message may be classified as positive if the majority of the words within the window are positive, or classified as negative if the majority of the words within the window are negative. More particularly, given a set of messages transmitted by the user via the microblogging service, a number of features may be collected. These features may include the percentage of positive messages with respect to the sentiment word, the percentage of negative messages with respect to the sentiment word t, and/or the percentage of neutral messages with respect to the sentiment word t.

Similarly, aggregate features indicating the overall sentiment (e.g., opinion) of the user u with respect to the target class may also be collected. This may accomplished by ascertaining a percentage of positive messages with respect to the set of sentiment words for the target class, a percentage of negative messages with respect to the set of sentiment words for the target class, and/or a percentage of neutral messages with respect to the set of sentiment words for the target class. The aggregate features may also indicate the number of sentiment words about which the user has an overall sentiment that is primarily positive, negative, and/or neutral. The user's sentiment with respect to the target class may be interpreted as positive, negative, or neutral based upon any of the above features. If the user's sentiment with respect to the target class is determined to be positive, the user may be identified (e.g., labeled) as a member of the target class.

Generic LDA (LING-GLDA)

While various models have been used to classify documents, such models are generally not available for classifying users. A Latent Dirichlet Allocation (LDA) model, as proposed by Blei, D.; Ng, A; and Jordan, M. 2002. Latent dirichlet allocation. JMLR (3): 993-1022, which is incorporated herein by reference for all purposes, describes representing documents by their corresponding bag of words. The LDA model may be adapted by replacing documents with users by representing each user by their corresponding bag of words. This modified LDA model may therefore be used to represent a user as a multinomial distribution over topics. This representation may help to classify the users, since members of a particular class may have a higher probability of transmitting messages about a particular topic. For example, Democrats may have, on average, a higher probability of talking about social reforms, while Republicans may have, on average, a higher probability of talking about oil drilling. Each class may therefore be associated with a set of one or more topics about which members of the class are most likely to communicate. Therefore, by determining which topic(s) a user mentions most often in their messages, the user may be classified in one or more of a plurality of classes that most likely correlate(s) with the topic(s).

In accordance with various embodiments, the modified LDA model may operate as follows. Given a number of users U and a number of topics K, each user u may be represented by a multinomial distribution $\Theta_u$ over the topics, which may be drawn from a Dirichlet prior with parameter $\alpha$. In addition, each topic may be represented by a multinomial distribution $\beta_k$, which may be drawn from another Dirichlet prior with parameter $\eta$. A user vocabulary may include all words transmitted in messages by the user. Each word position n in the user vocabulary may be assigned a topic $z_{u,n}$ drawn from $\Theta_u$, and the word in that position $w_{u,n}$ may be drawn from the distribution $\beta_{z,u,n}$.

The modified LDA model may be obtained by training a LDA parallel implementation, as described in Smola, A, and Narayanamurthy, S. 2010, "An architecture for parallel topic models," In Proceedings of VLDB, which is incorporated herein by reference for all purposes. For example, a set of seed users may each be represented by a set of words collected from their messages. From these sets of words, a set of topics may be obtained. Assuming that the class membership of each of the seed users is known, it is possible to derive features for classification. In other words, it is possible to determine the likelihood of each of the topics being associated with a particular class membership. The model may then be applied to obtain a topic distribution of a given user, which may be used as feature values for purposes of classifying the user.

Domain-Specific LDA

A domain-specific LDA (LING-DLDA) may be derived from a set of seed users that are pertinent to a particular classification task. For example, a set of seed users that includes only Democrat and Republican users may be used to build a model for a political affiliation classification task. While LING-GLDA returns coarse-grained topics such as soccer, music and politics, LING-DLDA should return fine-grained topics that are more discriminative for the classification task. The model may be derived as described above for LING-LDA.

4. Social Network

Social network features may represent social connections established by a user with others via a social network such as a microblogging service. For example, the social connections may include connections with members of the social network that the user follows, to whom the user replies and/or whose messages the user reposts (e.g., retweets).

The following social network features explore the social connections established by the user with others the user follows, to whom the user replies, or whose messages the user reposts (e.g., retweets).

Prototypical Friend Accounts

Information pertaining to "friend" accounts (SOC-FRIE) may be used to derive one or more features for a particular user. For example, intuitively, Democrats are more likely to follow the accounts of Democratic politicians. Similarly, Republicans are more likely to follow the accounts of Republican politicians. Therefore, it may be presumed that users from a particular class or set of classes share one or more "friend" accounts.

In accordance with various embodiments, as described above with respect to prototypical words, a set of class-specific prototypical "friend" accounts F may be bootstrapped for each class by exploring the social network of users using a training set of seed users (e.g., using Equation 1). A number of aggregate and individual social network-based features may then be derived for a given user u using the set of class-specific prototypical "friend" accounts F. These aggregate and individual social network-based features may include one or more of the following: number of accounts in F that are friends of the user u (e.g., accounts that the user is following); percentage of accounts in F that are friends of the user u; and percentage of all social network (e.g., Twitter) accounts followed by the user u which are part of F. For example, for each prototypical "friend" account, a boolean feature may be set to 1 if the user follows the account, and 0 otherwise. Feature values may be further derived using Equations 2 and 3. Accordingly, one or more feature values may be based, at least in part, upon social connections established by the user via the social network (e.g., microblogging service) with respect to a set of prototypical friend accounts associated with the particular class in which classification is being performed.

Prototypical Replied and Retweeted Users

One or more social network features may be derived based upon activity of the user with respect to one or more social connections of the user that have been established via the social network (e.g., microblogging service). Similarly to SOC-FRIE, a set of prototypical replied (SOC-REP) users may be bootstrapped from a set of seed users (e.g., using Equation 1), where the set of prototypical replied users includes users from a particular class that users in that class tend to reply to. In addition, a set of prototypical retweeted users (SOC-RET) may include specific users (e.g., specific accounts) from a particular class from which users of that class tend to repost (e.g., retweet) messages (e.g., young girls may tend to retweet messages sent by Justin Bieber's account). These two sets of features SOC-REP and SOC-RET may be derived as set forth above with respect to LING-WORD and LING-HASH. More particularly, accounts cited in messages (e.g., tweets) of users of a specific class may be identified. In accordance with various embodiments, the accounts cited in messages of users of a particular class that are also prefixed by a reply tag ('@') and/or retweet tag ('RT') may be identified. A set of prototypical replied and/or retweeted accounts may then be obtained by applying Equation 1, as described above, by identifying a number k of the most significant replied/retweeted accounts. Feature values may then be derived as set forth above using Equations 2 and 3. Accordingly, one or more features may be based, at least in part, upon activity of the user with respect to one or more social connections of the user that have been established via the social network (e.g., microblogging service) and a set of prototypical replied/retweeted accounts associated with the particular class in which classification is being performed.

The disclosed embodiments support the classification of users of social media services such as microblogging services. Through leveraging observable information such as the linguistic content of messages transmitted via a social media service, user behavior, and/or network structure, it is possible to classify users. This may be accomplished by applying a machine learning approach that relies on feature values derived from such user information. Example classification tasks may include political affiliation detection, ethnicity identification, and detecting affinity for a particular business. In this manner, the disclosed embodiments may automatically infer values of user attributes (e.g., class membership) such as political affiliation based upon information gathered via the social media service.

Figure 4:
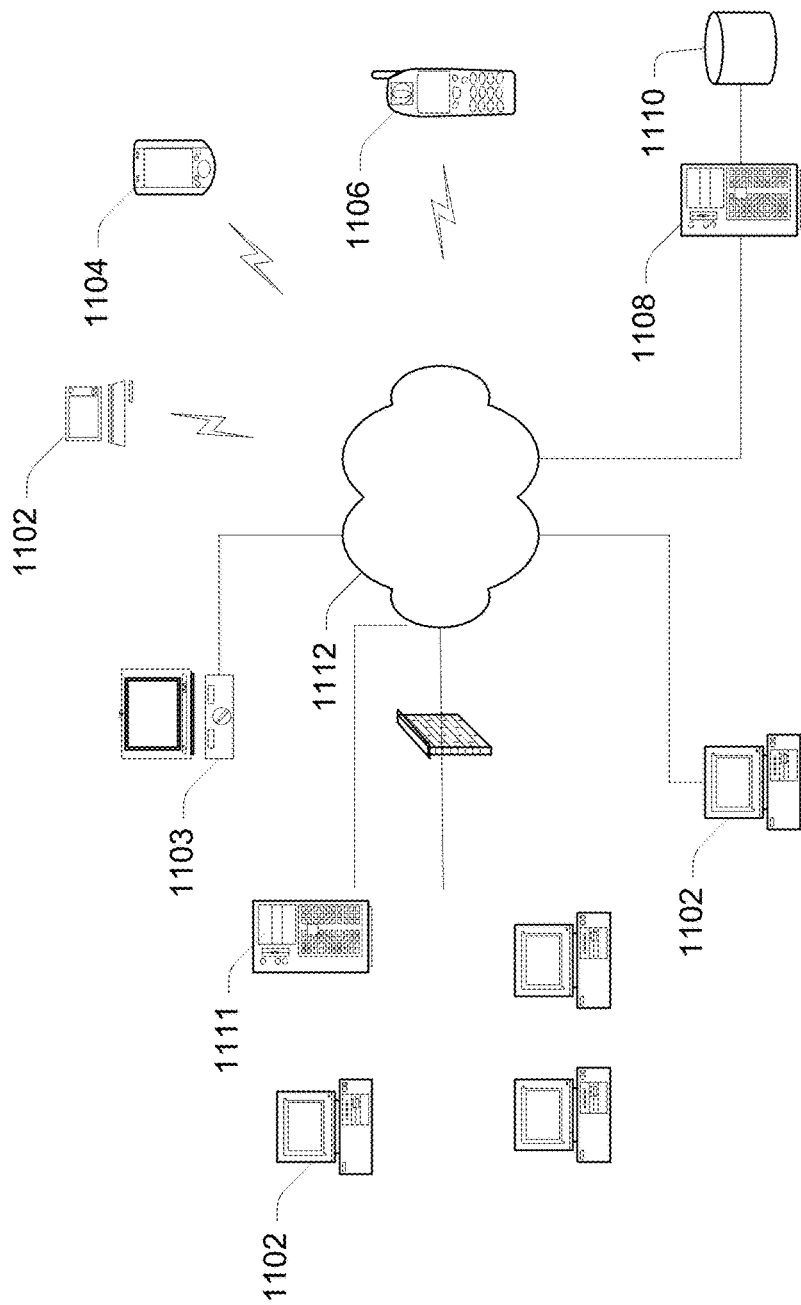
FIG. 4 is a diagram of an example network environment in which various embodiments may be implemented.

The disclosed embodiments may be implemented in any of a wide variety of computing contexts. For example, as illustrated in FIG. 4, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, a message may be posted via a graphical user interface from a user's interaction with a local application, web site or web-based application or service and may be accomplished using any of a variety of well-known mechanisms for obtaining information from a user. However, it should be understood that such methods of obtaining input from a user are merely examples and that a message posted by a user may be obtained in many other ways.

A user may be classified according to the disclosed embodiments in some centralized manner. This is represented in FIG. 4 by user classification server 1108 and data store 1110 which, as will be understood, may correspond to multiple distributed devices and data stores. The server 1108 may receive or otherwise obtain messages posted by one or more users via one or more messaging servers 1111, and retain this messaging data in the data store 1110.

Each social network service may be supported by at least one of the messaging servers 1111. In this example, one messaging server 1111 is illustrated for purposes of clarity. However, it is important to note that each social network service may be supported by more than one messaging server. Furthermore, the disclosed embodiments may also be applied with respect to messages obtained from more than one social network service.

The messaging server 1111 may take any suitable form for providing messaging services such as short messaging services. In one implementation, the messaging server 1111 implements a messaging application such as Twitter, instant messaging, social networking, blogging, etc. A messaging application generally allows a user (human or automated entity) to communicate with one or more other users via a communication device (e.g., telephone, personal digital assistant (PDA), computer, etc.) via one or more networks and retain user message information in one or more databases.

Based upon the content of the messages, user profile(s), the social network, and/or user behavior with respect to the social network, users may be classified by the server 1108. The server 1108 may provide a variety of services, offers, or advertisements to classified users. Such services may include recommendations or links to content on the social network or affiliated sites. Other services may include graphical or statistical information pertaining to user classification. For example, such graphical or statistical information may be used to detect and represent trends or reactions to various events.

The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, categories or content types to be displayed in association with the disclosed methods, search results, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 5:
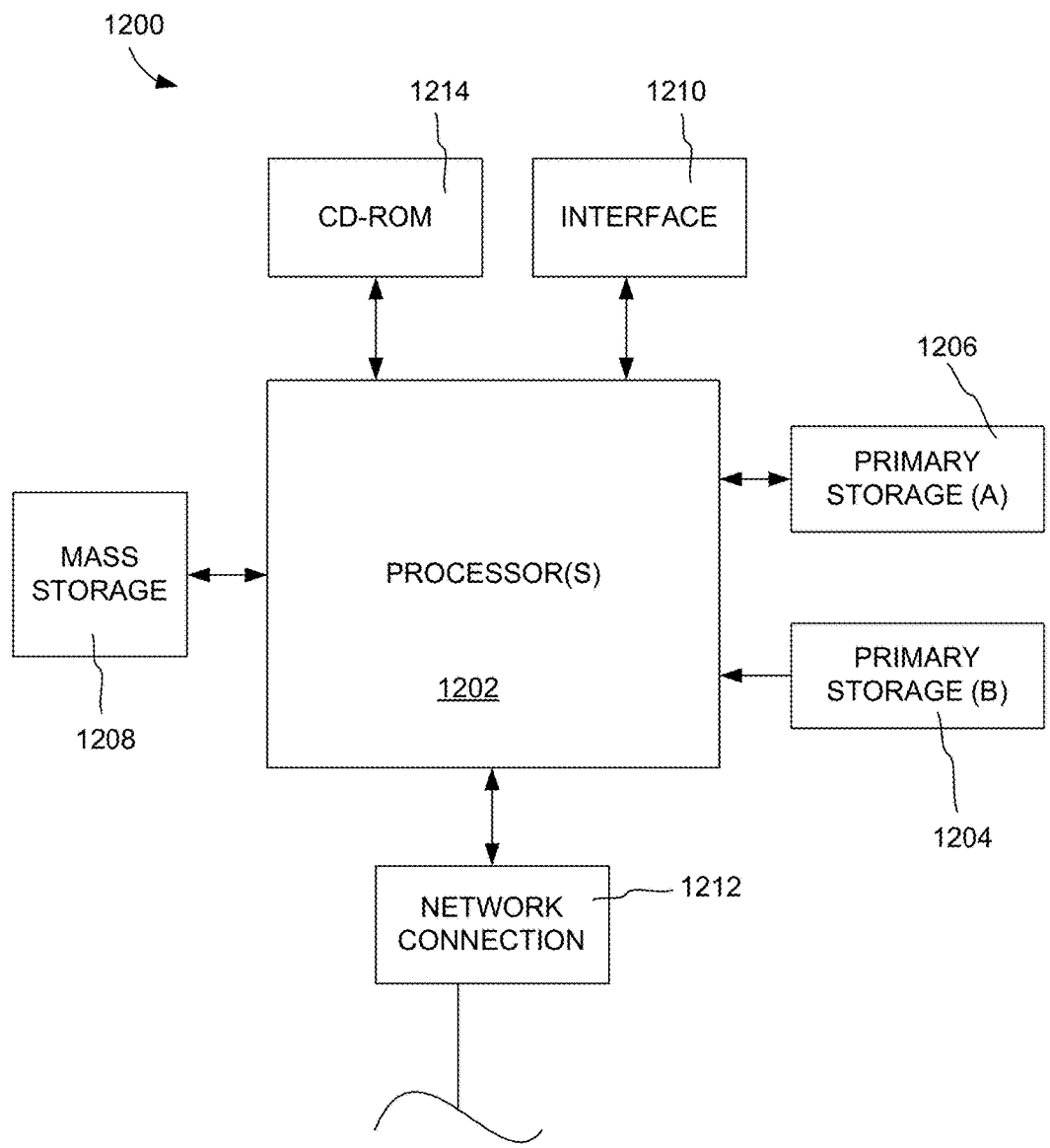
FIG. 5 illustrates an example computer system in which various embodiments may be implemented.

FIG. 5 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
obtaining a plurality of messages posted by a user via a microblogging service;
determining a set of prototypical replied accounts associated with a particular class or prototypical retweeted accounts associated with the particular class, wherein determining includes identifying accounts cited in messages of users of the particular class, the messages of the users of the particular class being replies or retweets;
obtaining a set of feature values associated with the user, each of the set of feature values corresponding to a different one of a set of one or more features, wherein at least a portion of the set of feature values is obtained based, at least in part, on content of the plurality of messages posted by the user via the microblogging service, wherein at least one of the portion of the set of feature values is determined based, at least in part, upon activity of the user with respect to the set of prototypical replied accounts associated with the particular class or prototypical retweeted accounts associated with the particular class; and
classifying by a processor the user based upon the set of feature values associated with the user such that the user is classified based, at least in part, on the content of the plurality of messages, wherein classifying the user includes labeling the user to indicate whether the user is a member of the particular class;
wherein one or more of the portion of the set of feature values indicates a sentiment of the user with respect to one or more prototypical words of a set of prototypical words representative of the particular class, the set of prototypical words representing the particular class including a plurality of prototypical words, the sentiment being positive, negative, or neutral.

2. The method as recited in claim 1, wherein one or more of the portion of the set of feature values is based, at least in part, upon social connections established by the user via the microblogging service with respect to a set of prototypical friend accounts associated with the particular class.

3. The method as recited in claim 2, wherein the one or more of the portion of the set of feature values include a feature value that indicates whether the user is a follower of the set of prototypical friend accounts associated with the particular class.

4. The method as recited in claim 1, wherein the set of features comprises a plurality of features, and wherein classifying by a processor the user based upon the set of feature values associated with the user such that the user is classified based, at least in part, on the content of the plurality of messages comprises:
applying a machine learned mathematical model to the set of feature values associated with the user, wherein the machine learned model includes a weight associated with each of the plurality of features.

5. The method as recited in claim 4, further comprising: training the machine learned mathematical model using a set of seed users for which class membership is known.

6. The method as recited in claim 1, wherein classifying the user further comprises:
ascertaining whether the user is a member of the particular class.

7. The method as recited in claim 1, wherein one or more of the set of feature values is based, at least in part, upon social connections established by the user via the microblogging service.

8. The method as recited in claim 1, wherein one or more of the set of feature values is derived based upon activity of the user with respect to one or more social connections of the user that have been established via the microblogging service, wherein the activity of the user includes at least one of: following the one or more social connections of the user, replying to messages of the one or more social connections of the user, or reposting messages of the one or more social connections of the user.

9. The method as recited in claim 1, wherein one or more of the portion of the set of feature values is based, at least in part, upon a subset of the set of prototypical words that are identified within the plurality of messages, wherein classifying the user comprises:
ascertaining whether the user is a member of the particular class.

10. The method as recited in claim 1, wherein one or more of the portion of the set of feature values is based, at least in part, upon a subset of a set of prototypical hashtags that are identified in the plurality of messages, the set of prototypical hashtags representing the particular class, wherein classifying the user comprises:
ascertaining whether the user is a member of the particular class.

11. The method as recited in claim 1, wherein classifying the user comprises detecting a political affiliation of the user, performing ethnicity identification to identify an ethnicity of the user, detecting a gender of the user, or detecting affinity of the user for a particular business.

12. The method as recited in claim 1, wherein classifying the user comprises:
representing the user by a multinomial distribution over a plurality of topics.

13. The method as recited in claim 1, wherein the particular class is a specific class of users.

14. The method as recited in claim 1, wherein one or more of the portion of the set of feature values is based, at least in part, upon a subset of a set of prototypical topics that are identified in the plurality of messages, the set of prototypical topics representing the particular class, wherein classifying the user comprises:
ascertaining whether the user is a member of the particular class.

15. A non-transitory computer-readable storage medium storing thereon computer-readable instructions, comprising:
instructions for obtaining a plurality of messages posted by a user via a microblogging service;
instructions for determining a set of prototypical replied accounts associated with a particular class or prototypical retweeted accounts associated with the particular class, wherein determining includes identifying accounts cited in messages of users of the particular class, the messages of the users of the particular class being replies or retweets;
instructions for obtaining a set of feature values associated with the user, each of the set of feature values corresponding to a different one of a set of one or more features, wherein at least a portion of the set of feature values is obtained based, at least in part, on content of the plurality of messages posted by the user via the microblogging service, wherein at least one of the portion of the set of feature values is determined based, at least in part, upon activity of the user with respect to the set of prototypical replied accounts associated with the particular class or prototypical retweeted accounts associated with the particular class; and
instructions for classifying the user based upon the set of feature values associated with the user such that the user is classified based, at least in part, on the content of the plurality of messages, wherein classifying the user includes labeling the user to indicate whether the user is a member of the particular class;
wherein one or more of the portion of the set of feature values indicates a sentiment of the user with respect to one or more prototypical words of a set of prototypical words representative of the particular class, the set of prototypical words representing the particular class including a plurality of prototypical words, the sentiment being positive, negative, or neutral.

16. The non-transitory computer-readable storage medium as recited in claim 15, further comprising:
instructions for aggregating the plurality of messages transmitted or posted by the user via the microblogging service into a single document;
wherein obtaining the set of feature values associated with the user comprises deriving the at least a portion of the set of feature values, at least in part, from at least a portion of the content of the plurality of messages in the single document.

17. The non-transitory computer-readable storage medium as recited in claim 16, wherein the instructions for obtaining a set of feature values associated with the user comprises:
instructions for generating a set of one or more numerical values characterizing linguistic content of the plurality of messages of the user.

18. The non-transitory computer-readable storage medium as recited in claim 16, wherein the set of feature values pertains to at least one of the set of prototypical words representing the particular class, a set of prototypical topics representing the particular class, or a set of prototypical hashtags representing the particular class, wherein classifying the user comprises ascertaining whether the user is a member of the particular class.

19. The non-transitory computer-readable storage medium as recited in claim 16, wherein one of the plurality of messages includes an audio message, wherein aggregating the plurality of messages transmitted or posted by the user via the microblogging service into a single document comprises:
converting the audio message into text.

20. The non-transitory computer-readable storage medium as recited in claim 15, wherein one or more of the set of feature values pertains to one or more topics of interest to the user or lexical usage of the user within the plurality of messages.

21. An apparatus, comprising:
a processor; and
a memory, at least one of the processor or the memory being adapted for:
obtaining a plurality of messages posted by a user via a microblogging service;
determining a set of prototypical replied accounts associated with a particular class or prototypical retweeted accounts associated with the particular class, wherein determining includes identifying accounts cited in messages of users of the particular class, the messages of the users of the particular class being replies or retweets;
obtaining a set of feature values associated with the user, each of the set of feature values corresponding to a different one of a set of one or more features, wherein at least a portion of the set of feature values is obtained based, at least in part, on content of the plurality of messages posted by the user, wherein at least one of the portion of the set of feature values is determined based, at least in part, upon activity of the user with respect to the set of prototypical replied accounts associated with the particular class or prototypical retweeted accounts associated with the particular class; and
classifying the user based upon the set of feature values associated with the user such that the user is classified based, at least in part, on the content of the plurality of messages, wherein classifying the user includes labeling the user to indicate whether the user is a member of the particular class;
wherein one or more of the portion of the set of feature values indicates a sentiment of the user with respect to one or more prototypical words of a set of prototypical words that is representative of the particular class, the set of prototypical words representative of the particular class including a plurality of prototypical words, the sentiment being positive, negative, or neutral.

22. The apparatus as recited in claim 21, wherein classifying the user further comprises:
ascertaining whether the user is a member of the particular class.

23. The apparatus as recited in claim 21, wherein one or more of the set of feature values is based, at least in part, upon a subset of the set of prototypical words identified within the plurality of messages, wherein classifying the user comprises:
ascertaining whether the user is a member of the particular class.

24. The apparatus as recited in claim 21, further comprising:
ascertaining whether the user is a member of the particular class.

25. The apparatus as recited in claim 21, wherein one or more of the set of feature values is based, at least in part, upon a subset of a set of prototypical hashtags that are identified in the plurality of messages, the set of prototypical hashtags representing the particular class, wherein classifying the user comprises:
ascertaining whether the user is a member of the particular class.

26. The apparatus as recited in claim 21, wherein each one of a plurality of classes is associated with a corresponding set of topics about which members of the one of the plurality of classes are most likely to communicate, wherein each set of topics is a subset of a plurality of topics, wherein obtaining a set of feature values associated with the user comprises:
identifying one or more of the plurality of topics from linguistic content of the plurality of messages, thereby enabling the user to be classified in one or more of the plurality of classes.

27. The apparatus as recited in claim 21, wherein one or more of the set of feature values is based, at least in part, upon a subset of a subset of a set of prototypical topics that are identified in the plurality of messages, the set of prototypical topics representing the particular class, wherein classifying the user comprises:
ascertaining whether the user is a member of the particular class.

* * * * *